United States Patent
Furukawa

(10) Patent No.: US 9,420,175 B2
(45) Date of Patent: Aug. 16, 2016

(54) IMAGE PROCESSING SYSTEM, IMAGE PROCESSING METHOD, AND COMPUTER-READABLE MEDIUM

(71) Applicant: OLYMPUS CORPORATION, Shibuya-ku, Tokyo (JP)

(72) Inventor: Eiji Furukawa, Saitama (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/796,835

(22) Filed: Jul. 10, 2015

(65) Prior Publication Data
US 2015/0319363 A1 Nov. 5, 2015

Related U.S. Application Data

(63) Continuation of application No. PCT/JP2014/079609, filed on Nov. 7, 2014.

(30) Foreign Application Priority Data

Mar. 27, 2014 (JP) ................. 2014-066283

(51) Int. Cl.
| | |
|---|---|
| *H04N 5/228* | (2006.01) |
| *H04N 5/232* | (2006.01) |
| *G06T 11/60* | (2006.01) |
| *G06T 5/00* | (2006.01) |
| *H04N 5/262* | (2006.01) |
| *G06T 7/00* | (2006.01) |
| *G06T 3/40* | (2006.01) |

(52) U.S. Cl.
CPC .......... *H04N 5/23232* (2013.01); *G06T 3/4053* (2013.01); *G06T 5/002* (2013.01);
(Continued)

(58) Field of Classification Search
CPC . H04N 3/1587; H04N 5/23287; H04N 5/349; H04N 5/232; H04N 5/2628; G06T 2207/20221; G06T 7/0026
See application file for complete search history.

(56) References Cited

U.S. PATENT DOCUMENTS 8,873,889 B2 * 10/2014 Koga ................ G06T 3/4053
382/276
2002/0097324 A1 7/2002 Onuki
(Continued)

FOREIGN PATENT DOCUMENTS

| JP | 10191136 A | 7/1998 |
|---|---|---|
| JP | 2009164857 A | 7/2009 |

(Continued)

OTHER PUBLICATIONS

International Search Report (ISR) dated Feb. 10, 2015 issued in International Application No. PCT/JP2014/079609.

*Primary Examiner* — Sinh Tran
*Assistant Examiner* — Selam T Gebriel
(74) *Attorney, Agent, or Firm* — Holtz, Holtz & Volek PC

(57) ABSTRACT

To improve the resolution of a stationary region while suppressing artifacts in a moving region, an image processing system includes a misalignment-detecting circuit that detects an amount of misalignment between a plurality of time-series images; a high-resolution combining circuit that, based on the amount of misalignment, combines the plurality of images in a high-resolution space having a higher resolution than the plurality of images to generate a high-resolution combined image; an image-converting circuit that reduces the size of the high-resolution combined image by resampling to generate a converted image; a correlation-calculating circuit that calculates the correlation between a standard image serving as a standard among the plurality of images and the converted image for each region; and an image-correcting circuit that corrects the high-resolution combined image such that the combining ratio of the standard image becomes lower as the correlation calculated by the correlation-calculating circuit becomes higher.

13 Claims, 8 Drawing Sheets

(52) U.S. Cl.
CPC .............. G06T 7/0026 (2013.01); G06T 11/60 (2013.01); H04N 5/232 (2013.01); H04N 5/2628 (2013.01); *G06T 2207/10016* (2013.01); *G06T 2207/20221* (2013.01)

(56) References Cited

U.S. PATENT DOCUMENTS

| | | |
|---|---|---|
| 2009/0185721 A1 | 7/2009 | Hiraga et al. |
| 2009/0189900 A1* | 7/2009 | Furukawa ............. G06T 3/4069 345/428 |
| 2012/0213452 A1* | 8/2012 | Matsuyama .......... G06T 3/4053 382/294 |
| 2012/0269444 A1 | 10/2012 | Naito |
| 2014/0270518 A1* | 9/2014 | Yano ..................... H04N 5/232 382/167 |

FOREIGN PATENT DOCUMENTS

| | | |
|---|---|---|
| JP | 2011199786 A | 10/2011 |
| JP | 2012022653 A | 2/2012 |
| JP | 2012230486 A | 11/2012 |

\* cited by examiner

IMAGE PROCESSING SYSTEM, IMAGE PROCESSING METHOD, AND COMPUTER-READABLE MEDIUM

CROSS-REFERENCE TO RELATED APPLICATIONS

This is a continuation of International Application PCT/JP2014/079609, with an international filing date of Nov. 7, 2014, which is hereby incorporated by reference herein in its entirety. This application claims the benefit of Japanese Patent Application No. 2014-066283, the content of which is incorporated herein by reference.

TECHNICAL FIELD

The present invention relates to image processing systems, image processing methods, and storage media.

BACKGROUND ART

There is a known image processing system that calculates the amounts of correlation between a standard image serving as a standard among a plurality of captured images and the images other than the standard image among the plurality of images and that combines the images other than the standard image at a lower combining ratio as the amount of correlation becomes smaller (see, for example, PTL 1).

If the subject has a fine pattern, a region where the subject is moving (hereinafter simply referred to as "moving region") is correctly determined to have a larger difference between images, which results in a smaller amount of correlation; however, a region where the subject is stationary (hereinafter simply referred to as "stationary region") is erroneously determined to have a larger difference between images because of aliasing, which results in a smaller amount of correlation. That is, whereas artifacts due to subject movement and pixel misalignment can be reduced in a moving region, an inaccurate amount of correlation is calculated in a stationary region with aliasing even if the pixels are aligned. This makes it impossible to achieve high resolution.

CITATION LIST

Patent Literature

{PTL 1}
Japanese Unexamined Patent Application, Publication No. 2011-199786

SUMMARY OF INVENTION

An aspect of the present invention is an image processing system including a misalignment-detecting circuit that detects an amount of misalignment between a plurality of time-series images; a high-resolution combining circuit that, based on the amount of misalignment, combines the plurality of images in a high-resolution space having a higher resolution than the plurality of images to generate a high-resolution combined image; an image-converting circuit that reduces the size of the high-resolution combined image by resampling to generate a converted image; a correlation-calculating circuit that calculates the correlation between a standard image serving as a standard among the plurality of images and the converted image for each region; and an image-correcting circuit that corrects the high-resolution combined image such that the combining ratio of the standard image becomes lower as the correlation calculated by the correlation-calculating circuit becomes higher.

DESCRIPTION OF EMBODIMENTS

Figure 1:
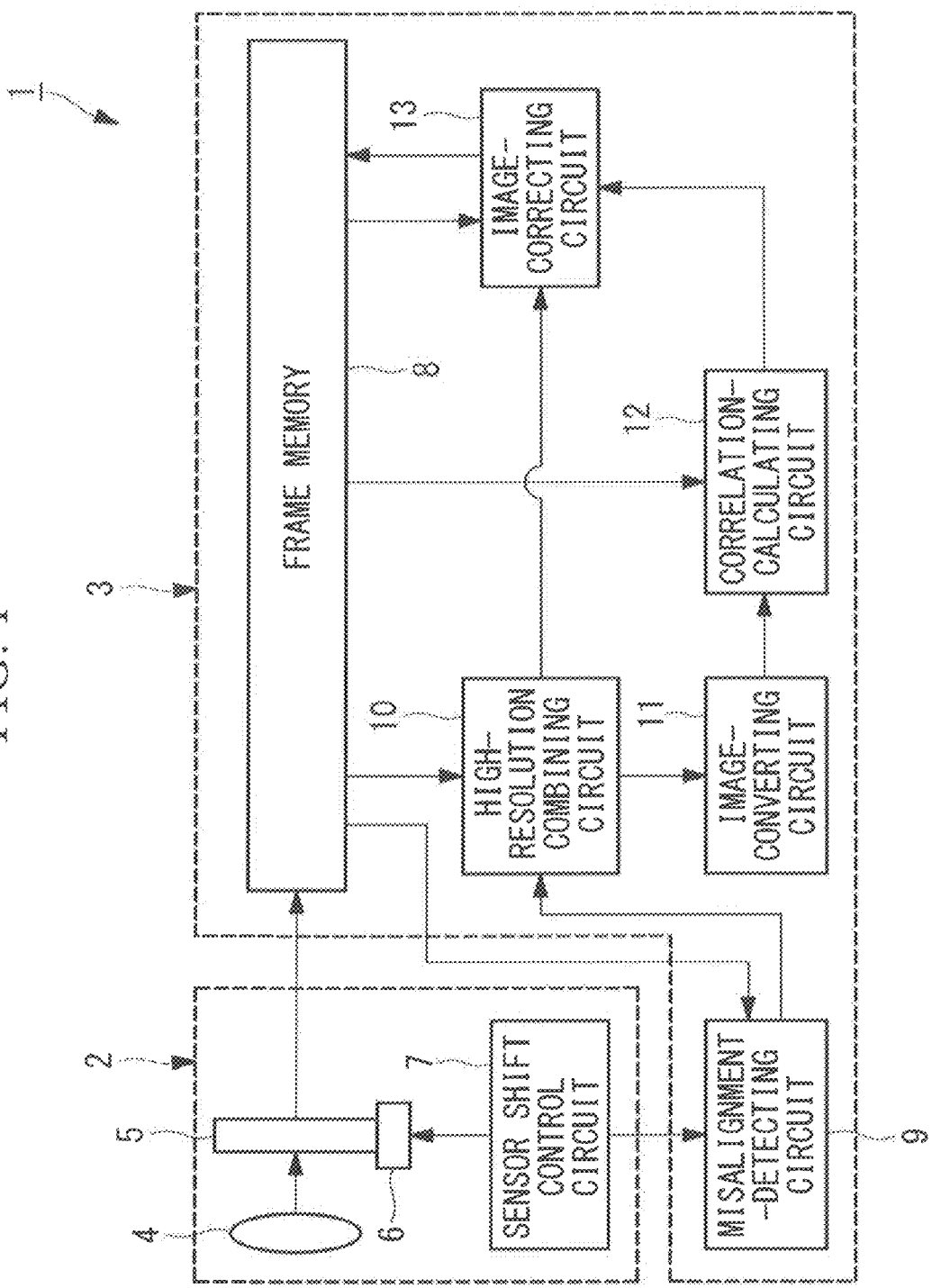
FIG. 1 is a block diagram illustrating an image processing system according to an embodiment of the present invention.

An image processing system and image processing method according to an embodiment of the present invention will be described below with reference to the drawings. As shown in FIG. 1, an image processing system 1 according to this embodiment, which is, for example, a camera, includes an image-acquiring circuit 2 that captures images of a subject to acquire a plurality of images P and a main system circuit 3 that processes the plurality of images P acquired by the image-acquiring circuit 2.

The image-acquiring circuit 2 includes an optical system 4 that focuses light, an image-capturing device 5 that captures an image of the light focused by the optical system 4, a sensor shift mechanism 6 that shifts the image-capturing device 5 parallel to an image-capturing surface thereof, and a sensor shift control circuit 7 that controls the direction and amount of shift of the image-capturing device 5.

The optical system 4, which is, for example, an imaging lens, focuses light coming from the subject to form an optical image of the subject on the image-capturing surface of the image-capturing device 5.

Figure 2:
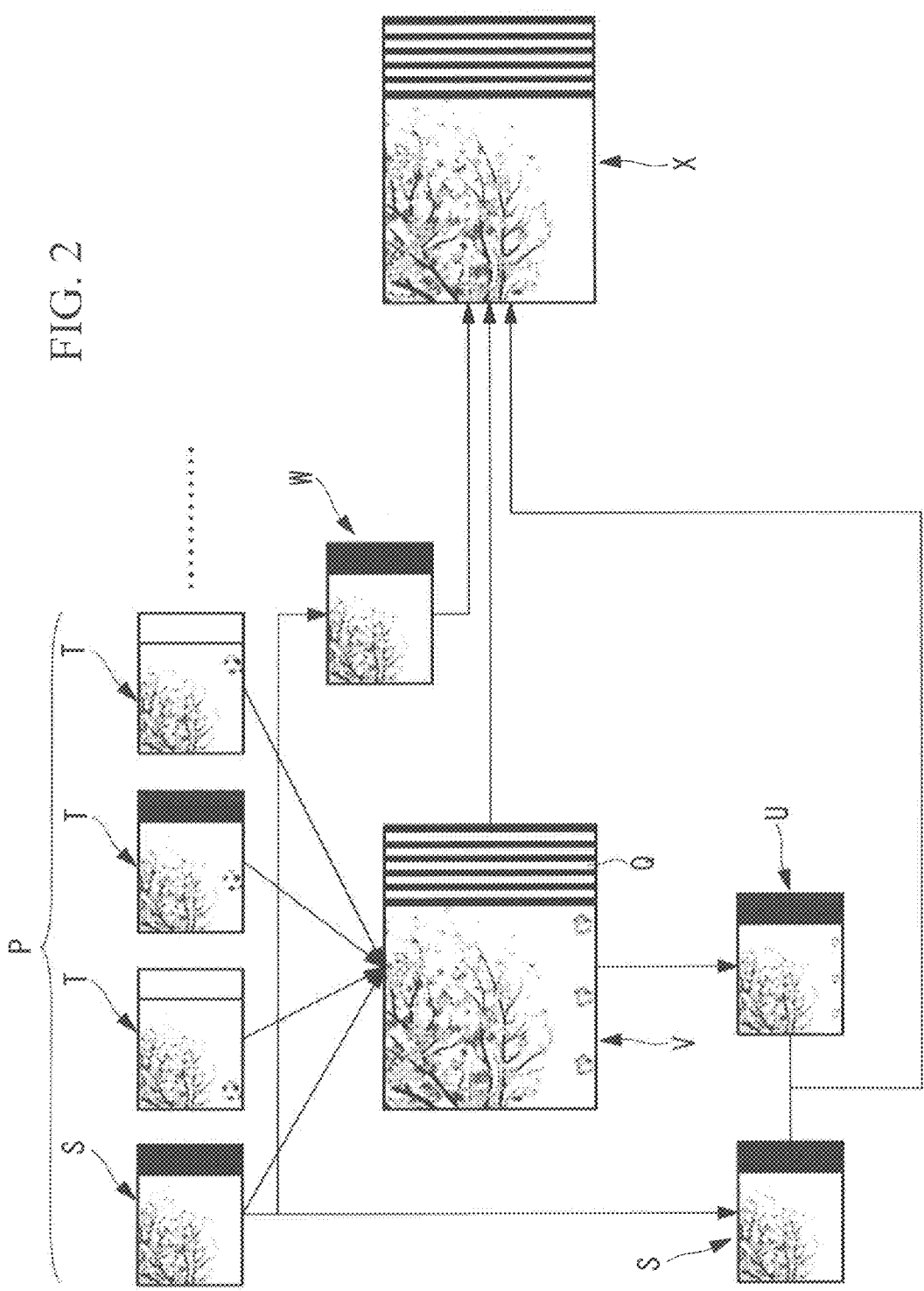
FIG. 2 is a conceptual diagram of images processed by the image processing system in FIG. 1.

The image-capturing device 5, which has, for example, a pixel pattern (Bayer pattern) shown in FIG. 2, is disposed such that the image-capturing surface thereof is substantially perpendicular to the optical axis of the optical system 4 to capture the optical image of the subject formed on the image-capturing surface, thereby acquiring an image.

The sensor shift mechanism 6 can two-dimensionally shift the image-capturing device 5 in two orthogonal directions parallel to the image-capturing surface thereof in units of subpixels.

The sensor shift control circuit 7 controls the sensor shift mechanism 6 to shift the image-capturing device 5 when it captures the plurality of images P and outputs information about the direction and amount of shift of the image-capturing device 5 (hereinafter simply referred to as "sensor shift control information") to the main system circuit 3.

The main system circuit 3 includes a frame memory 8 that stores the plurality of images P acquired by the image-capturing device 5, a misalignment-detecting circuit 9 that detects the amounts of misalignment between the plurality of images P, a high-resolution combining circuit 10 that combines the plurality of images P to generate a high-resolution combined image V, an image-converting circuit 11 that resamples the high-resolution combined image V to generate a converted image U, a correlation-calculating circuit 12 that calculates the correlation between the converted image U and a standard image S serving as a standard among the plurality of images P for each region, and an image-correcting circuit 13 that corrects the high-resolution combined image V based on the calculated correlation.

Upon receiving the sensor shift control information from the sensor shift control circuit 7, the misalignment-detecting circuit 9 detects the amounts of misalignment between the standard image S and the images other than the standard image S (hereinafter referred to as "reference images T") among the plurality of images P and outputs the detected amounts of misalignment to the high-resolution combining circuit 10.

The high-resolution combining circuit 10 arranges the plurality of images P stored in the frame memory 8 in a high-resolution space having a higher resolution than the images P for each color channel (e.g., R, Gr, Gb, and B) while aligning the plurality of images P based on the amounts of misalignment received from the misalignment-detecting circuit 9.

Specifically, the pixels of the standard image S are first arranged in the high-resolution space, and the pixels of each reference image T are then arranged at positions shifted by the amount of misalignment between the standard image S and the reference image T acquired by the misalignment-detecting circuit 9.

If the pixels to be arranged have the same color as the pixels that have been arranged of the standard image S or other reference images T, they do not have to be arranged, or the pixel values may be updated to the arithmetic means of the values of the pixels to be arranged and the pixels that have been arranged of the same color.

After arranging the pixels of all images, the high-resolution combining circuit 10 executes a procedure for interpolating information for missing pixels between the pixels that have been arranged in the high-resolution space based on the information for the pixels that have been arranged.

Interpolation may be executed, for example, by performing direction-based interpolation based on edge directions using the neighboring pixels or by copying and interpolating the nearest pixels.

Figure 3:
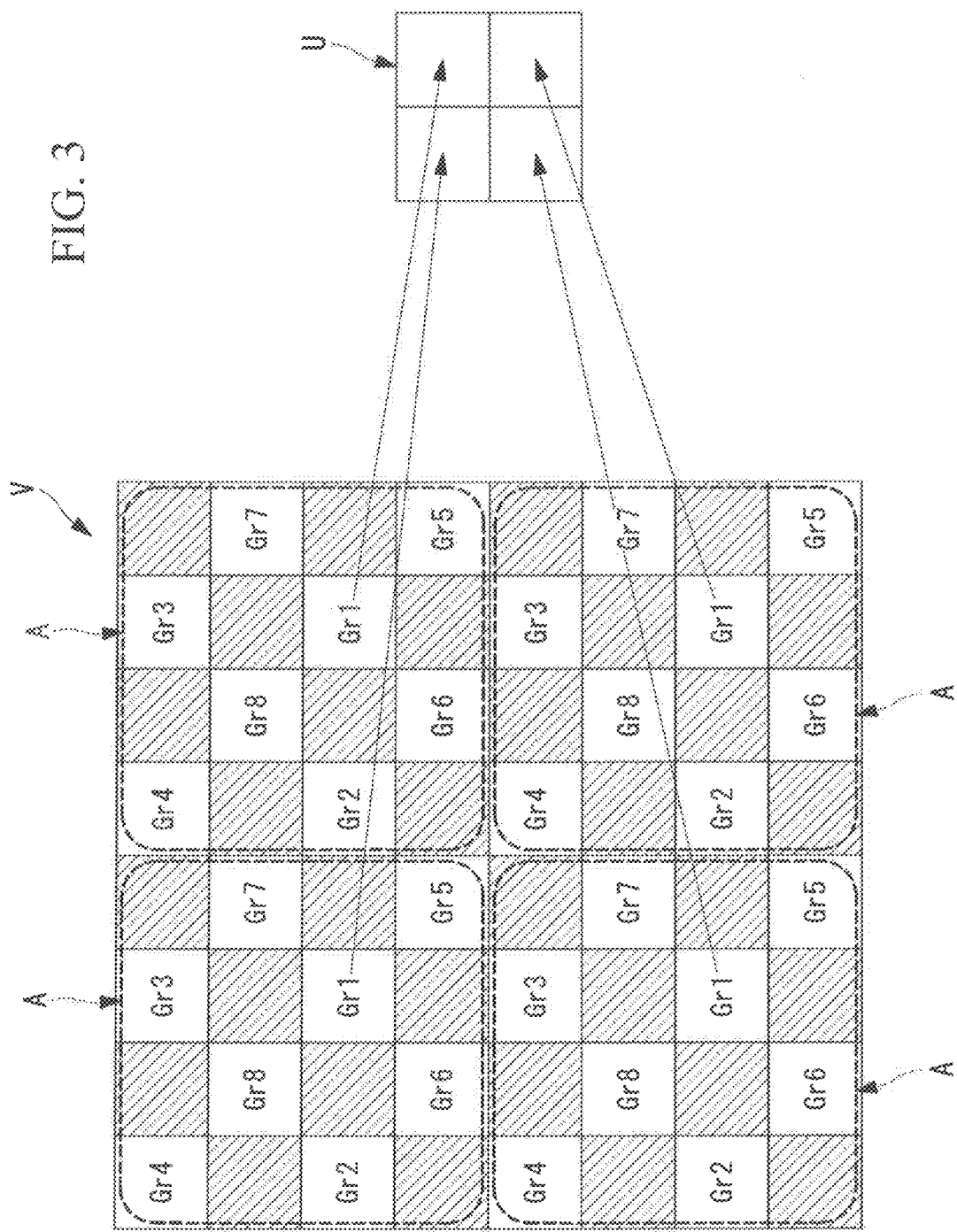
FIG. 3 is a conceptual diagram illustrating the resampling of the Gr channel of a high-resolution combined image in an image-converting circuit of the image processing system in FIG. 1.

As shown in FIG. 3, the image-converting circuit 11 resamples the high-resolution combined image V output from the high-resolution combining circuit 10 for each color channel. Resampling is the process of reducing the number of pixels in the high-resolution combined image V to which pixel information has been interpolated and thereby reducing the size thereof, for example, by sampling regions A around the pixels of the standard image S.

Before reducing the number of pixels by resampling, the image-converting circuit 11 executes weak low-pass filtering (hereinafter simply referred to as "low-pass filtering") using the pixels around the positions to be resampled in the high-resolution combined image V. The strength of the low-pass filter is adjustable and is adjusted to a higher level for a smaller number of images and a lower proportion (coverage) of pixels that have been arranged in each region before interpolation.

Low-pass filtering needs to be performed such that the pixels of the captured reference images T are mixed with those of the standard image S because, if the number of pixels is reduced by directly sampling the pixels of the standard image S during resampling, the image generated by resampling has exactly the same pixel information as the standard image S, and therefore, no correlation is calculated by the correlation-calculating circuit 12.

As shown in FIG. 3, the image-converting circuit 11 can reduce the size of the high-resolution combined image V subjected to low-pass filtering to generate a low-resolution converted image U.

The correlation-calculating circuit 12 calculates the correlation between the converted image U output from the image-converting circuit 11 and the standard image S output from the frame memory 8 in the same format for each region, for example, as an absolute difference sum or difference square sum.

The correlation-calculating circuit 12 enlarges the information about the calculated correlation between the standard image S and the converted image U generated by resampling to the size of the high-resolution combined image V and outputs the enlarged information to the image-correcting circuit 13. The correlation-calculating circuit 12 may rescale the correlation information by enlargement copying such as nearest-neighbor scaling or interpolation such as bicubic interpolation.

Figure 4:
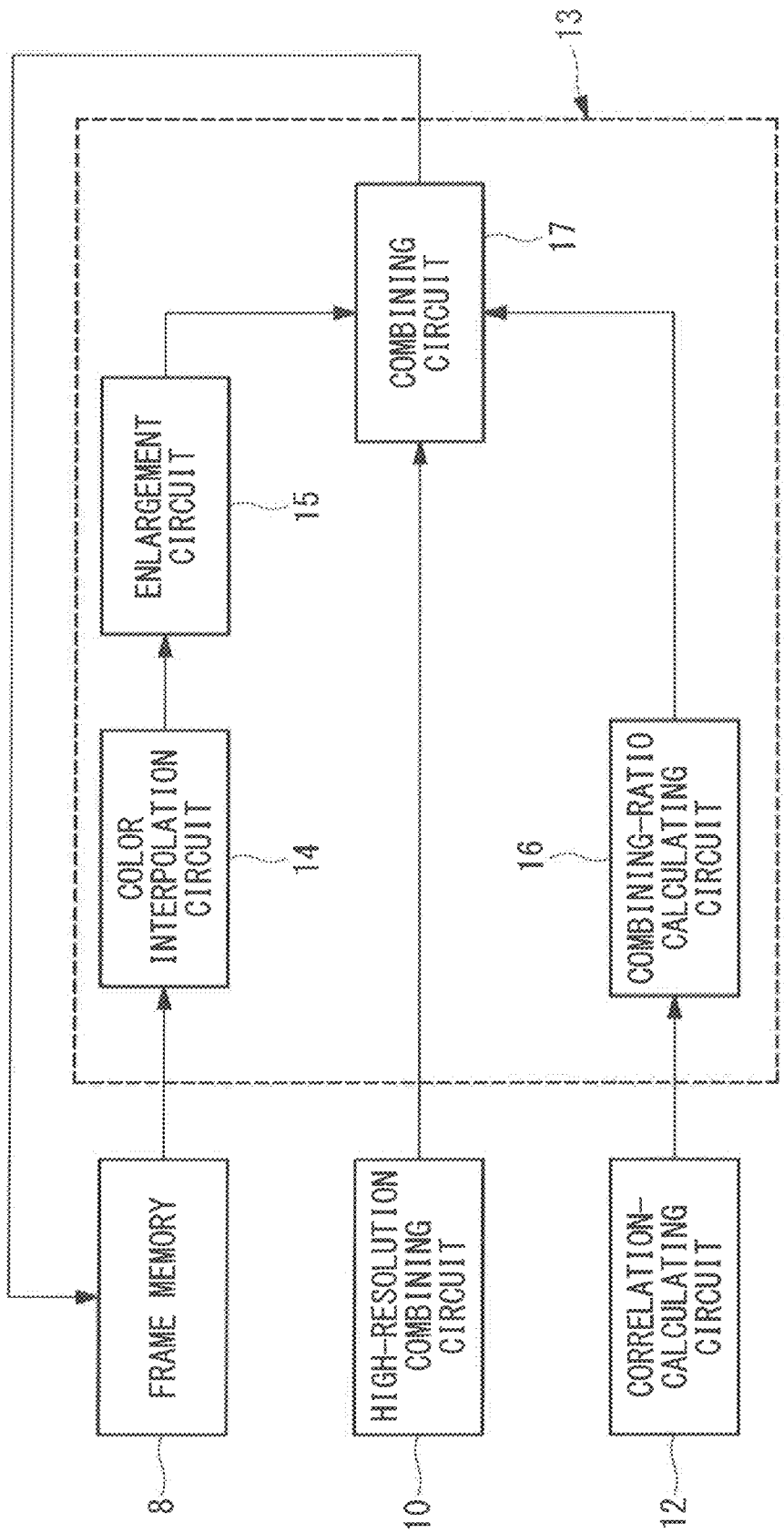
FIG. 4 is a block diagram illustrating an image-correcting circuit of the image processing system in FIG. 1.

As shown in FIG. 4, the image-correcting circuit 13 includes a color interpolation circuit 14 that subjects the standard image S to color interpolation, an enlargement circuit 15 that enlarges the standard image S subjected to color interpolation by the color interpolation circuit 14 to generate an enlarged standard image W, a combining-ratio calculating circuit 16 that calculates the combining ratio based on the correlation, and a combining circuit 17 that combines the enlarged standard image W and the high-resolution combined image V based on the calculated combining ratio.

The color interpolation circuit 14 subjects the standard image S, which has a Bayer pattern, output from the frame memory 8 to color interpolation to acquire three color planes (or four color planes).

The enlargement circuit 15 enlarges the three color planes of the standard image S output from the color interpolation circuit 14 to the same size as the high-resolution combined image V to generate an enlarged standard image W.

Figure 5:
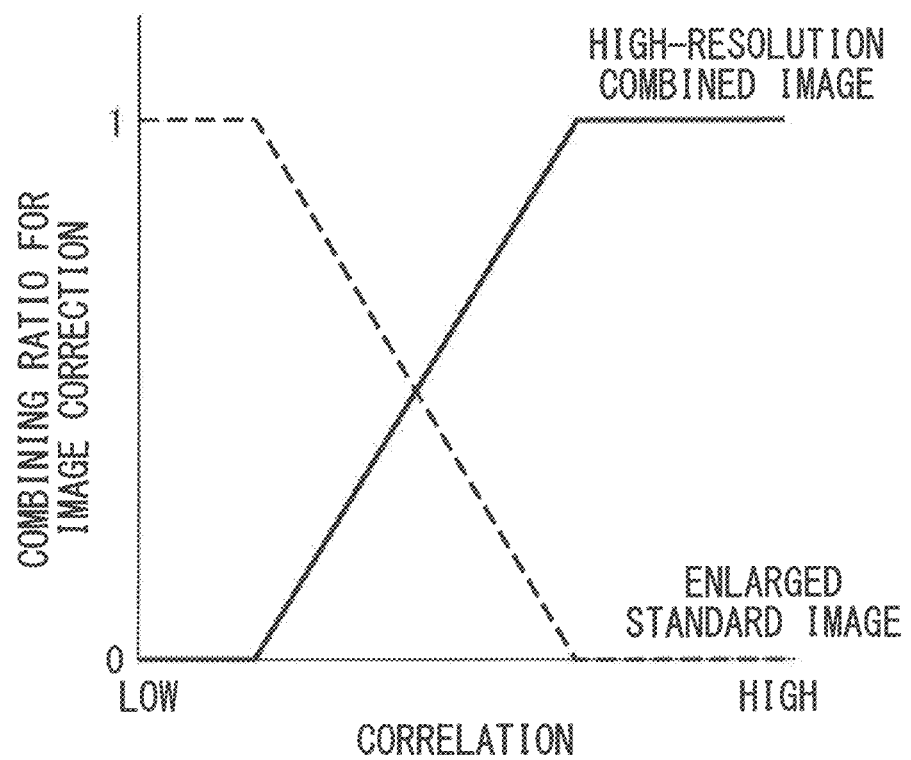
FIG. 5 is a graph showing the relationship between the combining ratio of an enlarged standard image to a high-resolution combined image for image correction in a combining-ratio calculating circuit of the image processing system in FIG. 1.

The combining-ratio calculating circuit 16 calculates the combining ratio from the correlation information output from the correlation-calculating circuit 12. As shown in FIG. 5, the combining ratio of the enlarged standard image W is calculated to be higher at a lower correlation (smaller correlation) and is calculated to be lower at a higher correlation (larger correlation). In FIG. 5, the vertical axis indicates the magnitude of the combining ratio, whereas the horizontal axis indicates the degree of correlation.

The combining circuit 17 combines the enlarged standard image W received from the enlargement circuit 15 and the high-resolution combined image V received from the high-resolution combining circuit 10 based on the combining ratio output from the combining-ratio calculating circuit 16 to generate a corrected image X.

The resulting corrected image X is input to and stored in the frame memory 8.

An image processing method using the thus-configured image processing system 1 according to this embodiment will be described below with reference to FIG. 2.

The image processing system 1 according to this embodiment first focuses light collected through the imaging lens 4 on the image-capturing surface of the image-capturing device 5, acquires a plurality of time-series images P while shifting the image-capturing device 5 with the sensor shift mechanism 6, and stores the plurality of images P in the frame memory 8.

After the plurality of images P are stored in the frame memory 8, the misalignment-detecting circuit 9 detects the amounts of misalignment between the standard image S and the reference images T (step of detection). Based on the detected amounts of misalignment, the high-resolution combining circuit 10 aligns and combines the standard image S and the reference images T in a high-resolution space to generate a high-resolution combined image V (step of generating a high-resolution combined image).

As shown in FIG. 2, the high-resolution combined image V generated by the high-resolution combining circuit 10 shows a subject Q having a fine black-and-white pattern at the right side of the screen. Among the plurality of images P acquired by the image-capturing device 5, the first image, which is the standard image S, and the third image, which is a reference image T, have black regions sampled at the position of the subject Q having the black-and-white pattern in the high-resolution combined image V. The second and fourth images, which are both reference images T, have white regions sampled at the same position. This subject Q having the black-and-white pattern, which is a finely patterned subject, causes aliasing (hereinafter simply referred to as "folding") in the low-resolution images P, which results in a black or white region due to inaccurate imaging of the subject Q having the black-and-white pattern.

However, the high-resolution combined image V generated from the low-resolution images S and T based on the amounts of misalignment detected by the misalignment-detecting circuit 9 has high resolution in a region where there is a stationary subject (stationary region). This allows the subject Q having the black-and-white pattern to be reproduced in the region that appears black or white in the images P with folding at the right side of the screen.

Figure 6:
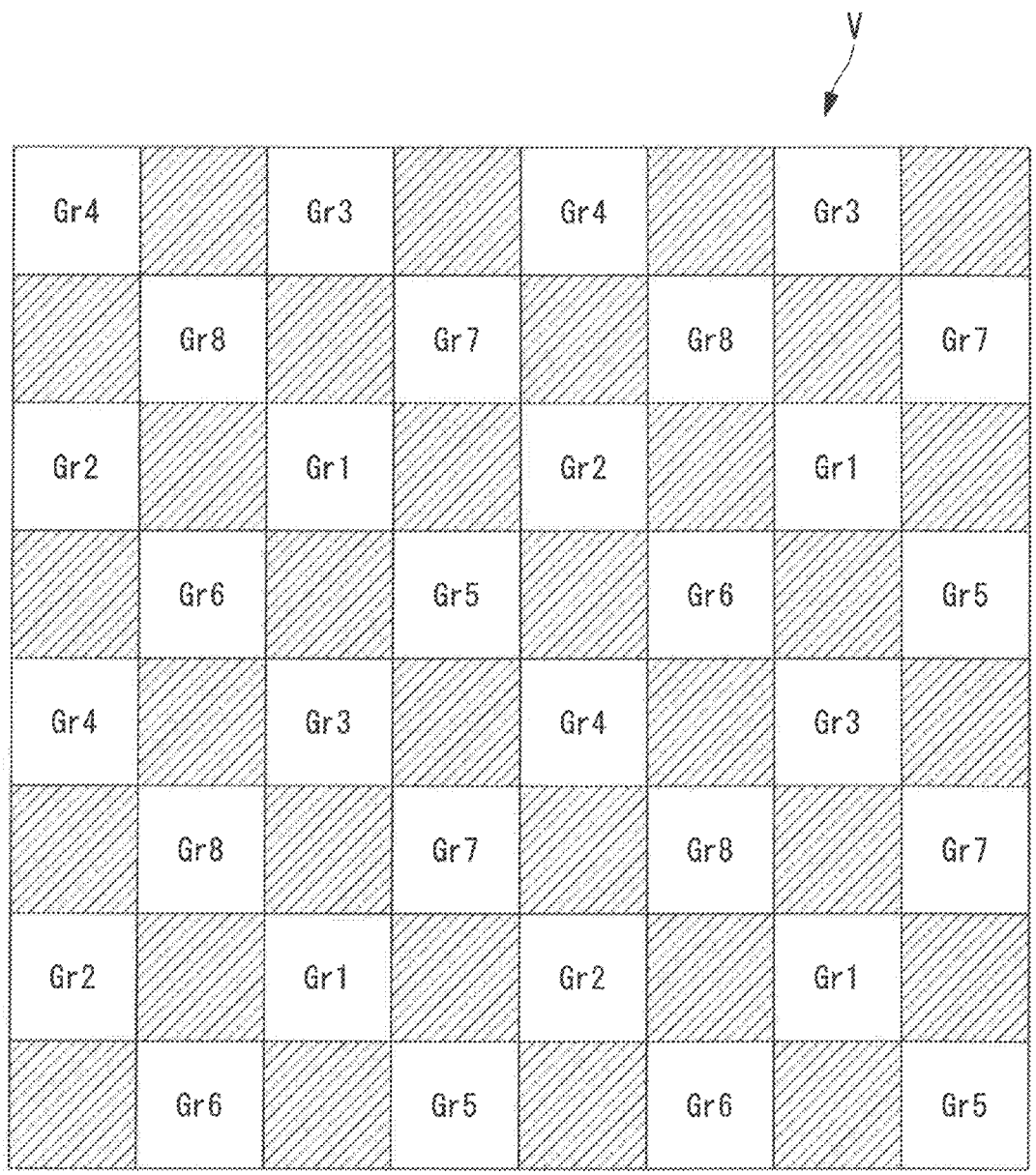
FIG. 6 is a conceptual diagram illustrating the Gr channel of a high-resolution combined image generated by a high-resolution combining circuit of the image processing system in FIG. 1.

FIG. 6 shows only the Gr channel of the high-resolution combined image V. In addition to the Gr channel, a Bayer pattern includes Gb, R, and B channels, which are similar concepts, as described below.

The numbers after the symbol "Gr" in FIG. 6 indicate the order in which the plurality of images P are captured, each square having a size of 0.5 pixel.

In this example, as shown in FIG. 6, the high-resolution combined image V is generated by capturing the images P while shifting, using the positions of the pixels Gr1 of the first image as a standard:

the pixels Gr2 of the second image by 1 pixel from the standard in the horizontal direction and by 0 pixel from the standard in the vertical direction;

the pixels Gr3 of the third image by 0 pixel from the standard in the horizontal direction and by 1 pixel from the standard in the vertical direction;

the pixels Gr4 of the fourth image by 1 pixel from the standard in the horizontal direction and by 1 pixel from the standard in the vertical direction;

the pixels Gr5 of the fifth image by 0.5 pixel from the standard in the horizontal direction and by 0.5 pixel from the standard in the vertical direction;

the pixels Gr6 of the sixth image by 1.5 pixel from the standard in the horizontal direction and by 0.5 pixel from the standard in the vertical direction;

the pixels Gr7 of the seventh image by 0.5 pixel from the standard in the horizontal direction and by 1.5 pixel from the standard in the vertical direction; and the pixels Gr8 of the eighth image by 1.5 pixel from the standard in the horizontal direction and by 1.5 pixel from the standard in the vertical direction, and arranging the pixels in a high-resolution space based on the amounts of misalignment from the standard. The hatched pixels in FIG. 6 indicate pixels added by interpolating the neighboring pixels that have been arranged.

After the image-converting circuit 11 reduces the number of pixels of the high-resolution combined image V by resampling to generate a converted image U (step of generating a converted image), the correlation-calculating circuit 12 calculates the correlation between the converted image U and the standard image S for each region (step of calculating the correlation). Thus, the correlation is calculated to be low only in the region where there is a moving subject (moving region) and to be high in the stationary region where there is the subject Q having the black-and-white pattern at the right side of the screen.

Upon receiving the calculated correlation information, the combining-ratio calculating circuit 16 calculates the combining ratio of the enlarged standard image W, which is generated by enlarging the standard image S, to the high-resolution combined image V based on the received correlation such that the combining ratio of the enlarged standard image W becomes lower as the correlation becomes higher (step of correction).

The correlation between the low-resolution converted image U generated by resampling the high-resolution combined image V and the enlarged standard image W can be calculated to acquire a correlation distribution where the correlation is low only in the moving region. The combining ratio of the enlarged standard image W can be made higher in the moving region, where the correlation is low, whereas the combining ratio of the high-resolution combined image V can be made higher in the region other than the moving region.

Thus, this method is advantageous in that it can improve the resolution of a stationary region irrespective of the presence of folding, while suppressing artifacts such as ghost images in a moving region.

In this case, the correlation-calculating circuit 12 enlarges the distribution image of the calculated correlation to the resolution of the high-resolution combined image V so that the size of the distribution image of the correlation calculated from the low-resolution converted image U matches the size of the high-resolution combined image V. This is advantageous in that it facilitates the calculation of the combining ratio in the combining-ratio calculating circuit 16.

Although the image processing system 1 in this embodiment is a camera including the image-acquiring circuit 2, the present invention is also applicable to image processing systems including no image-acquiring circuit 2 (e.g., personal computer). The image processing by the image processing system 1 described above is not necessarily implemented by hardware, but may instead be implemented by software or a combination of hardware and software.

Although the misalignment-detecting circuit 9 in this embodiment detects the amount of misalignment from the sensor shift control information received from the sensor-shifting control circuit 7, it may detect the amount of misalignment in other ways. For example, the misalignment-detecting circuit 9 may detect the amount of misalignment from the data for the plurality of images P stored in the frame memory 8 (the standard image S and the reference images T in the top of FIG. 2) by calculating the amount of global motion of the entire image, or the amount of local motion in each region, between the images S and T.

In this way, the misalignment-detecting circuit 9 can acquire the motion vectors in the horizontal and vertical directions by techniques such as block matching for each segment block having a size of 32×32 pixels to detect the amount of misalignment. The motion information acquired is not necessarily information about the motions in the horizontal and vertical directions, but may be information about the changes in rotational direction and scaling.

Although the image-converting circuit 11 in this embodiment adjusts the strength of the low-pass filter to a higher level for a smaller number of images and a lower proportion (coverage) of pixels that have been arranged in each region before interpolation, it may be adjusted in other ways. For example, the strength of the low-pass filter may be adjusted to a higher level under manufacturer parameter settings where image resolution is given priority and may be adjusted to a lower level if the suppression of artifacts is given priority.

In this embodiment, the image-converting circuit 11 may adjust the low-pass strength of the low-pass filter based on a control parameter for controlling the results of correction in the image-correcting circuit 13.

In this way, the low-pass strength can be adjusted, for example, to a higher level under manufacturer parameter settings where resolution is given priority and to a lower level if the suppression of artifacts is given priority.

Figure 7:
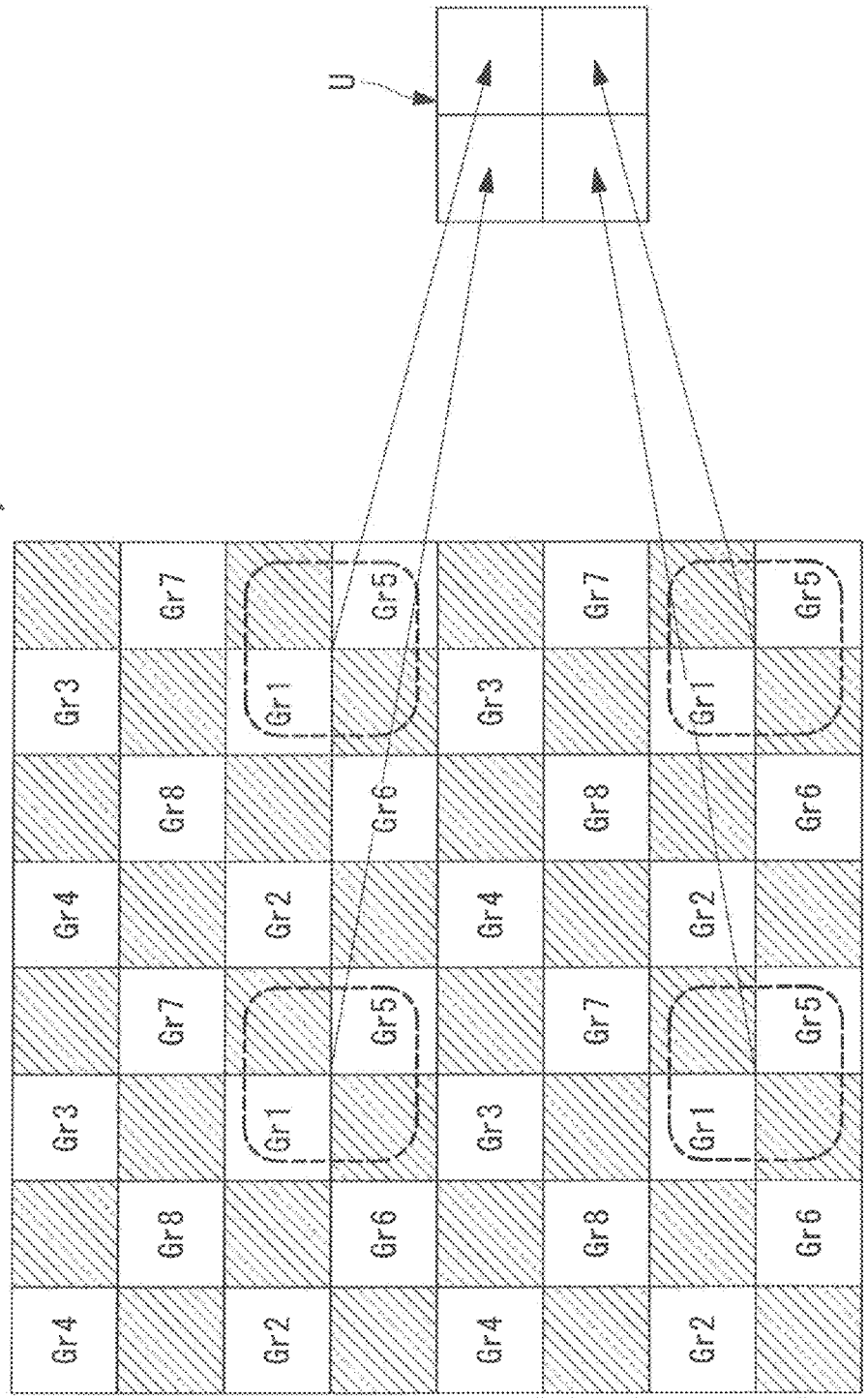
FIG. 7 is a conceptual diagram illustrating a first modification of the resampling in the image-converting circuit in FIG. 3.

In this embodiment, the image-converting circuit 11 may simultaneously execute interpolation and low-pass filtering such that neighboring pixels are mixed during the interpolation after pixels are arranged (hereinafter simply referred to as "low-pass effect"). Alternatively, as shown in FIG. 7, the low-pass effect may be achieved by slightly shifting the standard image S and mixing highly weighted pixels (e.g., Gr5) by weighted addition of the pixels around the pixels of the standard image S during resampling.

Figure 8:
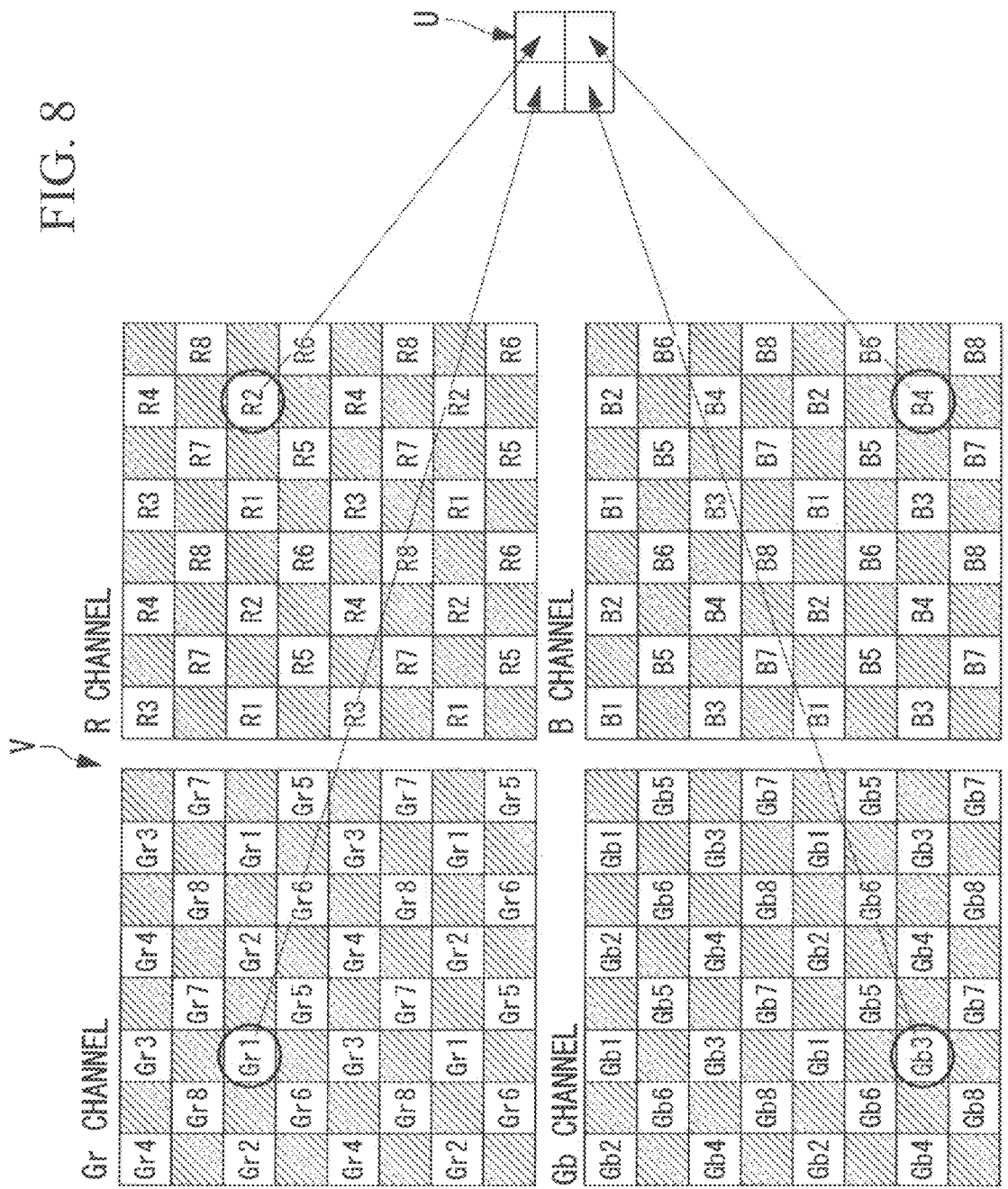
FIG. 8 is a conceptual diagram illustrating a second modification of the resampling in the image-converting circuit in FIG. 3.

In this case, the color channel for sampling may be changed depending on the method for calculating the correlation in the correlation-calculating circuit 12. For example, to calculate the correlation using the G (Gr or Gb) channel after the standard image S is subjected to color interpolation to acquire three color planes, as shown in FIGS. 3 and 7, sampling may be executed using Gr (Gr may be replaced with Gb in the figures, or Gr and Gb may be resampled and combined to provide results of resampling for G). To calculate the correlation with the Bayer pattern of the standard image S, as shown in FIG. 8, sampling may be executed on different color channels of different images P so that the sampled converted image U has a Bayer pattern.

Although the correlation-calculating circuit 12 in this embodiment calculates the correlation, for example, as an absolute difference sum or difference square sum, it may calculate the correlation in any other way that allows the correlation between the images S and U to be calculated. The various circuits illustrated in this embodiment may be mounted on a single chip or may be separately mounted on different wiring boards.

Although this embodiment illustrates an image processing system and an image processing method, a program for causing a computer to implement these image processing functions may be stored in a non-transient computer-readable medium (storage medium) and may be read by a computer to execute image processing.

The above-described embodiment is derived from individual aspects of the present invention described below.

An aspect of the present invention is an image processing system including a misalignment-detecting circuit that detects an amount of misalignment between a plurality of time-series images; a high-resolution combining circuit that, based on the amount of misalignment, combines the plurality of images in a high-resolution space having a higher resolution than the plurality of images to generate a high-resolution combined image; an image-converting circuit that reduces the size of the high-resolution combined image by resampling to generate a converted image; a correlation-calculating circuit that calculates the correlation between a standard image serving as a standard among the plurality of images and the converted image for each region; and an image-correcting circuit that corrects the high-resolution combined image such that the combining ratio of the standard image becomes lower as the correlation calculated by the correlation-calculating circuit becomes higher.

According to this aspect, a plurality of time-series images are combined in a high-resolution space based on the amount of misalignment between the plurality of images to generate a high-resolution combined image. The image-converting circuit then converts the resulting high-resolution combined image into a converted image of reduced size by resampling, and the correlation-calculating circuit calculates the correlation between the standard image and the converted image. The image-correcting circuit then corrects the high-resolution combined image such that the combining ratio of the standard image becomes lower as the calculated correlation becomes higher.

The correlation between the low-resolution converted image generated by resampling the high-resolution combined image and the standard image can be calculated to acquire a correlation distribution where the correlation is low only in a region where there is a moving subject. The combining ratio of the standard image can be made higher in the region where there is a moving subject, where the correlation is low, whereas the combining ratio of the high-resolution combined image can be made higher in the region other than the region where there is a moving subject. This improves the resolution of a stationary region irrespective of the presence of aliasing, while suppressing artifacts such as ghost images in a moving region.

In the above aspect, the image processing system may further include an image-acquiring circuit that acquires the plurality of time-series images.

In the above aspect, the image-acquiring circuit may include an image-capturing device that acquires an image of a subject formed thereon, a sensor shift mechanism capable of shifting the position of the image formed on the image-capturing device relative to the image-capturing device during the acquisition of the plurality of images, and a sensor shift control circuit that controls the direction and amount of shift of the image.

In this way, the sensor shift mechanism can shift the position of the image relative to the image-capturing device based on the direction and amount of shift controlled by the sensor shift control circuit to acquire a plurality of images in which the position of the subject is shifted. The sensor shift mechanism may move the image-capturing device or may shift an optical system disposed in front of the image-capturing device relative to the image-capturing device.

In the above aspect, the misalignment-detecting circuit may calculate an amount of misalignment between the standard image and a reference image other than the standard image among the plurality of images based on the direction and amount of shift controlled by the sensor shift control circuit.

In this way, the amount of misalignment between the standard image and the reference image can be more accurately calculated.

In the above aspect, the misalignment-detecting circuit may calculate an amount of misalignment between the standard image and a reference image other than the standard image among the plurality of images for each region.

In the above aspect, the high-resolution combining circuit may arrange pixels of the plurality of images in the high-resolution space based on the amount of misalignment.

In this way, a high-resolution combined image can be generated in a simple manner.

In the above aspect, the high-resolution combining circuit may interpolate missing pixels based on information for the pixels that have been arranged in the high-resolution space.

In this way, information for missing pixels can be interpolated between the pixels of a single high-resolution combined image generated by arranging the pixels of the plurality of images to achieve a higher resolution.

In the above aspect, the image-converting circuit may execute low-pass filtering before reducing the size of the high-resolution combined image.

In this way, the correlation between the converted image and the standard image can be accurately calculated during the correlation calculation without generating an image having the same pixel information as the standard image, which would be generated if the number of pixels were reduced by directly resampling the pixels of the standard image.

In the above aspect, after the high-resolution combining circuit arranges pixels of the plurality of images in the high-resolution space, the image-converting circuit may adjust the low-pass strength of the low-pass filter based on the proportion of the pixels that have been arranged in each region.

In this way, the low-pass strength can be adjusted to a higher level for a lower proportion of pixels that have been arranged to achieve a higher resolution.

In the above aspect, the image-converting circuit may adjust the low-pass strength of the low-pass filter based on a control parameter for controlling results of correction in the image-correcting circuit.

In this way, the low-pass strength can be adjusted, for example, to a higher level if resolution is given priority and to a lower level if the suppression of artifacts is given priority.

In the above aspect, the correlation-calculating circuit may enlarge a distribution image of the calculated correlation to the resolution of the high-resolution combined image.

In this way, the size of the distribution image of the correlation calculated from the low-resolution image can be increased to match the size of the high-resolution combined image V to facilitate the correction in the image-correcting circuit.

In the above aspect, the image-correcting circuit may enlarge the standard image to the same size as the high-resolution combined image to generate an enlarged image and may combine the resulting enlarged image and the high-resolution combined image at a combining ratio determined based on the correlation.

In this way, the images can be easily combined using the combining ratio determined depending on the correlation information for the converted image and the standard image of equal size.

Another aspect of the present invention is an image processing method including the steps of detecting an amount of misalignment between a plurality of time-series images; combining the plurality of images in a high-resolution space having a higher resolution than the plurality of images based on the amount of misalignment to generate a high-resolution combined image; reducing the size of the high-resolution combined image by resampling to generate a converted image; calculating the correlation between a standard image serving as a standard among the plurality of images and the converted image for each region; and correcting the high-resolution combined image such that the combining ratio of the standard image becomes lower as the correlation becomes higher.

Another aspect of the present invention is a non-transitory computer-readable medium storing a computer program for causing a computer to execute the steps of detecting an amount of misalignment between a plurality of time-series images; combining the plurality of images in a high-resolution space having a higher resolution than the plurality of images based on the amount of misalignment to generate a high-resolution combined image; reducing the size of the high-resolution combined image by resampling to generate a converted image; calculating the correlation between a standard image serving as a standard among the plurality of images and the converted image for each region; and correcting the high-resolution combined image such that the combining ratio of the standard image becomes lower as the correlation becomes higher.

REFERENCE SIGNS LIST 1 image processing system
2 image-acquiring circuit
3 main system circuit
4 optical system (imaging lens)
5 image-capturing device
6 sensor shift mechanism
7 sensor shift control circuit
8 frame memory
9 misalignment-detecting circuit
10 high-resolution combining circuit
11 image-converting circuit
12 correlation-calculating circuit
13 image-correcting circuit

The invention claimed is:
1. An image processing system comprising:
a misalignment-detecting circuit that detects an amount of misalignment between a plurality of time-series images;
a high-resolution combining circuit that, based on the amount of misalignment, combines the plurality of images in a high-resolution space having a higher resolution than the plurality of images to generate a high-resolution combined image;
an image-converting circuit that reduces a size of the high-resolution combined image by resampling to generate a converted image;
a correlation-calculating circuit that calculates a correlation between a standard image serving as a standard among the plurality of images and the converted image for each region; and
an image-correcting circuit that corrects the high resolution combined image such that a combining ratio of the standard image becomes lower as the correlation calculated by the correlation-calculating circuit becomes higher.
2. The image processing system according to claim 1, further comprising an image-acquiring circuit that acquires the plurality of time-series images.

3. The image processing system according to claim 2, wherein the image-acquiring circuit comprises an image-capturing device that acquires an image of a subject formed thereon, a sensor shift mechanism capable of shifting a position of the image formed on the image-capturing device relative to the image-capturing device during the acquisition of the plurality of images, and a sensor shift control circuit that controls a direction and amount of shift of the image.

4. The image processing system according to claim 3, wherein the misalignment-detecting circuit calculates an amount of misalignment between the standard image and a reference image other than the standard image among the plurality of images based on the direction and amount of shift controlled by the sensor shift control circuit.

5. The image processing system according to claim 1, wherein the misalignment-detecting circuit calculates an amount of misalignment between the standard image and a reference image other than the standard image among the plurality of images for each region.

6. The image processing system according to claim 1, wherein the high-resolution combining circuit arranges pixels of the plurality of images in the high-resolution space based on the amount of misalignment.

7. The image processing system according to claim 6, wherein the high-resolution combining circuit interpolates missing pixels based on information for the pixels that have been arranged in the high-resolution space.

8. The image processing system according to claim 1, wherein the image-converting circuit executes low-pass filtering before reducing the size of the high-resolution combined image.

9. The image processing system according to claim 8, wherein, after the high-resolution combining circuit arranges pixels of the plurality of images in the high-resolution space, the image-converting circuit adjusts a low-pass strength of the low-pass filter based on a proportion of the pixels that have been arranged in each region.

10. The image processing system according to claim 8, wherein the image-converting circuit adjusts a low-pass strength of the low-pass filter based on a control parameter for controlling results of correction in the image-correcting circuit.

11. The image processing system according to claim 1, wherein the correlation-calculating circuit enlarges a distribution image of the calculated correlation to the resolution of the high-resolution combined image.

12. The image processing system according to claim 1, wherein the image-correcting circuit enlarges the standard image to the same size as the high-resolution combined image to generate an enlarged image and combines the resulting enlarged image and the high-resolution combined image at a combining ratio determined based on the correlation.

13. An image processing method comprising:
detecting an amount of misalignment between a plurality of time-series images;
combining the plurality of images in a high-resolution space having a higher resolution than the plurality of images based on the amount of misalignment to generate a high resolution combined image;
reducing a size of the high-resolution combined image by resampling to generate a converted image;
calculating a correlation between a standard image serving as a standard among the plurality of images and the converted image for each region; and
correcting the high-resolution combined image such that a combining ratio of the standard image becomes lower as the correlation becomes higher.

* * * * *